United States Patent [19]

Aoki

[11] Patent Number: 4,899,952
[45] Date of Patent: Feb. 13, 1990

[54] DOUBLE BEARING TYPE FISHING REEL

[75] Inventor: Atsuhito Aoki, Fuchu, Japan

[73] Assignee: Ryobi Ltd., Hiroshima, Japan

[21] Appl. No.: 225,370

[22] Filed: Jul. 28, 1988

[30] Foreign Application Priority Data

Aug. 3, 1987 [JP] Japan ............................ 62-119630[U]
Aug. 3, 1987 [JP] Japan ............................ 62-119631[U]

[51] Int. Cl.⁴ ..................... A01K 89/015; A01K 89/62
[52] U.S. Cl. .................................... 242/260; 242/295;
 242/303
[58] Field of Search ............... 242/211, 212, 215, 216,
 242/220, 221, 84.5 R, 84.5 A, 84.51 R, 84.51 A,
 260, 295, 303; 192/46

[56] References Cited
U.S. PATENT DOCUMENTS

| 1,005,154 | 10/1911 | Catucci | 242/84.5 R |
|---|---|---|---|
| 2,460,904 | 2/1949 | Reyburn | 242/84.52 |
| 2,993,660 | 7/1961 | Parks | 242/84.51 R |
| 3,697,012 | 10/1972 | Walker | 242/84.51 R |
| 4,421,285 | 12/1983 | Noda | 242/221 |
| 4,703,902 | 11/1987 | Prouza et al. | 242/84.51 R |
| 4,750,687 | 6/1988 | Sievert et al. | 242/84.51 A X |

FOREIGN PATENT DOCUMENTS

| 55-31898 | 7/1980 | Japan . |
|---|---|---|
| 58-5126 | 1/1983 | Japan . |
| 59-90373 | 6/1984 | Japan . |
| 61-80668 | 5/1986 | Japan . |
| 62-74233 | 4/1987 | Japan . |

1529496 10/1978 United Kingdom ............... 242/211

Primary Examiner—Joseph J. Hail, III
Attorney, Agent, or Firm—Oliff & Berridge

[57] ABSTRACT

A double bearing type fishing reel including a pair of side frames, a spool shaft rotatably supported by the side frames through bearings, a spool concentrically fixed to the spool shaft; a handle shaft rotatably supported to one of the side frames, a handle fixed to an end portion of the handle shaft, a master gear fixed to the other end portion of the handle shaft, and a pinion engaged with the master gear and provided coaxially with the spool shaft, the pinion being movable in an axial direction of the spool shaft. The reel further includes a clutch mechanism disposed in one of the side frames and provided between the handle and the spool for selectively engaging the pinion with the spool shaft; a drag mechanism provided between a drag support member secured to the side frame and a cover member provided over the side frame, the drag mechanism being coaxial with the spool shaft and the pinion; a drag control mechanism connected to the drag mechanism for controlling drag force of the drag mechanism; and a one-way clutch mechanism provided between the drag mechanism and the pinion for selectively connecting the pinion and the drag mechanism upon rotation of the handle shaft in a first direction but disconnecting the pinion and the drag mechanism upon rotation of the handle shaft in a second direction.

9 Claims, 6 Drawing Sheets

DOUBLE BEARING TYPE FISHING REEL

BACKGROUND OF THE INVENTION

The present invention relates to a double bearing type fishing reel, and more particularly, to a drag arrangement in the double bearing type fishing reel.

A double bearing type fishing reel generally provides a pair of side frames each providing a bearing, and a spool shaft extending between the side frames and rotatably supported by the bearings. A conventional drag arrangement in the double bearing type fishing reel is provided over a spool shaft as disclosed in Japanese Utility Model Publication No. 55-31898. Another type of drag arrangement is provided at a handle shaft for selectively allowing a brake disc to be brought into pressure contact with one of a spool and a master gear for drag braking operation by manipulation of a manual lever.

According to the drag arrangement, the fishing line winding force is determined by the drag force. After the fishing line releasing operation, the fish taking the bait and captured is allowed to freely swim in the water while a predetermined drag force is applied to the reel, so that the captured fish will be weakened. When the operator intends to wind up the fishing line, the operator must manipulate the drag lever to cancel the drag force so as to minimize the rotational resistance given by the drag arrangement. In this connection, it would be rather troublesome to manipulate the manual lever in accordance with the fishing line releasing and winding operations.

Further, according to the conventional type of drag arrangement, since the brake disc is in selective contact with the spool, a relatively large force is applied to the bearing which rotatably supports the spool, so that a large force is required for winding the fishing line, resulting in that the durability of the bearing may be degraded. This drawback is also recognizable according to other drag arrangements disclosed in Japanese Utility Model Application Kokai Nos. 59-90373 and 61-80688.

Still another conventional drag arrangement in the double bearing type fishing reel is disclosed in Japanese Utility Model Application Kokai No. 58-5126 and Japanese Patent Application Kokai No. 62-74233. In these types of drag arrangements, the teeth of the pinion which is connected between the master gear and the spool shaft are subjected to a large load responsive to the movement of the drag washers in the axial direction of the pinion. Therefore, the pinion undergoes excessive frictional wearing.

SUMMARY OF THE INVENTION

It is therefore an object of the present invention to overcome the above-described prior art disadvantages and to provide an improved double bearing type fishing reel having a drag arrangement.

Another object of this invention is to provide an improved drag arrangement capable of eliminating manipulation of a manual drag lever regardless of the fishing line releasing and rewinding operations.

Still another object of the invention is to provide a fishing reel in which relatively large size drag washers are assembleable so that minimized unit pressure is applied thereto, to thereby provide excellent slippage relative to the neighboring drag washers.

Still another object of the invention is to provide a fishing reel in which application of thrusting force to bearing portions which rotationally support a spool shaft is avoidable.

In accordance with the present invention, these and other objects will be attained by providing a double bearing type fishing reel including a pair of side frames having cover members provided thereover, a drag support connected to one of the side frames, a spool shaft rotatably supported by the side frames through bearings, a spool concentrically fixed to the spool shaft, a handle shaft rotatably supported to one of the side frames, a handle fixed to the one end portion of the handle shaft, a master gear fixed to the other end portion of the handle shaft, and a pinion meshingly engaged with the master gear and provided coaxially with the spool shaft, the pinion being movable in the axial direction of the spool shaft. The reel of this invention provides an improved construction which comprises a clutch mechanism disposed in one of the side frames and provided between the handle and the spool for selectively engaging the pinion with the spool shaft; a drag mechanism provided between the the cover member and the drag support and coaxial with the spool shaft and the pinion; a drag control mechanism connected to the drag mechanism for controlling drag force given by the drag mechanism; and, a one-way clutch mechanism provided between the drag mechanism and the pinion for selectively connecting the pinion and the drag mechanism upon rotation of the handle shaft in a first direction but disconnecting the pinion and the drag mechanims upon rotation of the handle shaft in a second direction.

DETAILED DESCRIPTION OF THE PREFERRED EMBODIMENTS

A first embodiment according to this invention will be described with reference to FIGS. 1 thru 7.

Figure 1:
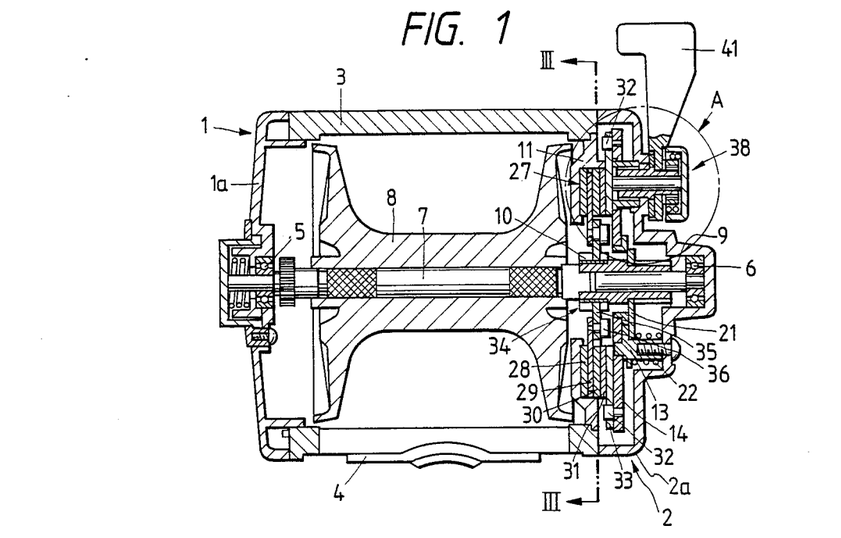
FIG. 1 is a cross-sectional front view showing a double bearing type fishing reel according to a first embodiment of this invention.
Figure 2:
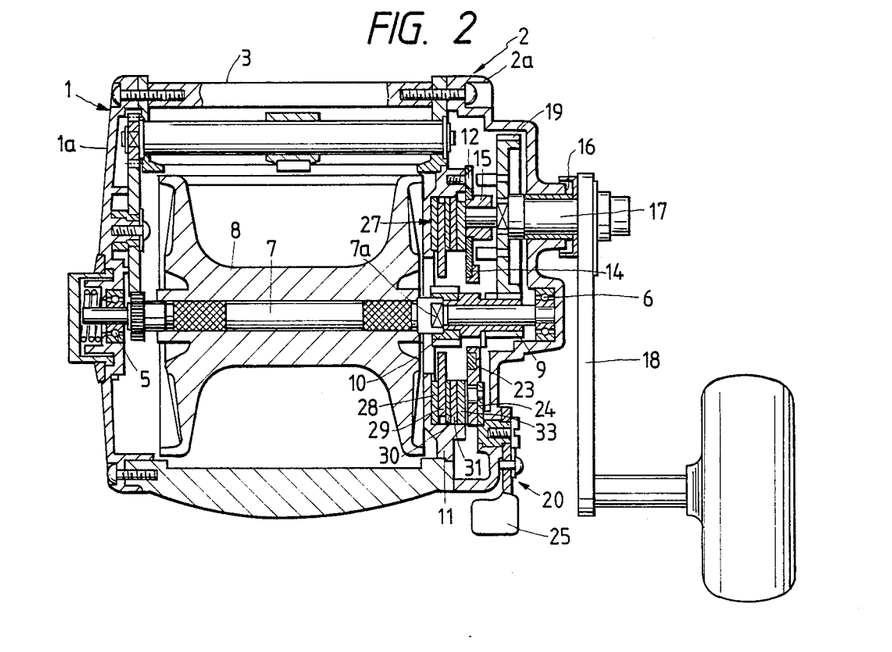
FIG. 2 is a cross-sectional front view but taken at a different sectional cutting than FIG. 1 showing the double bearing type fishing reel according to the first embodiment.

As best shown in FIGS. 1 and 2, a double bearing type fishing reel includes side frames 1 and 2 spaced away from each other and connected together by a plurality of connecting rods 3 and a fishing rod mount 4. The side frames 1 and 2 have cover members 1a and 2a whose central portions are internally provided with bearings 5 and 6 for rotatably supporting a spool shaft 7 on which a spool 8 is fixedly mounted.

Figure 7:
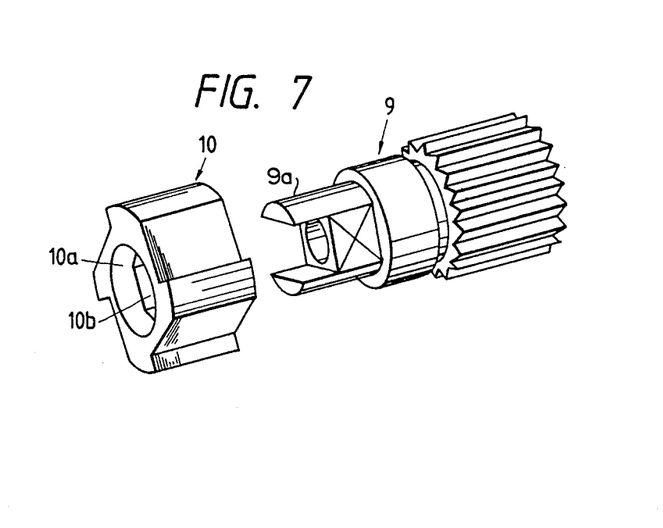
FIG. 7 is an exploded perspective view showing a pinion and a ratchet used in the fishing reel according to the first embodiment.

A pinion 9 is provided over one end portion of the spool shaft 7. The pinion 9 is provided rotatable together with the spool shaft 7 and is axially movable thereon. The pinion 9 has a first axial end portion, positioned close to the spool 8, provided with a ratchet 10. As shown in FIG. 7, the rachet 10 has a central bore 10a connected to an oblong shaped bore 10b, while the first end of the pinion 9 is formed with an oblong shaped bearing portion 9a engageable with the oblong shaped bore 10b, so that the ratchet is rotatable together with the pinion 9. The spool shaft 7 is also provided with an oblong shaped portion 7a (FIG. 2) engageable with the ratchet 10. When the ratchet 10 and the pinion 9 are moved in an axial direction toward the spool 8, the oblong shaped bore 10b is brought into engagement with the oblong shaped portion 7a of the spool shaft 7. On the other hand, when the pinion 9 and the ratchet 10 are moved in an axial direction toward the cover member 2a, the pinion 9 and the ratchet 10 are disengaged from the spool shaft 7.

Figures 3, 4, 5:
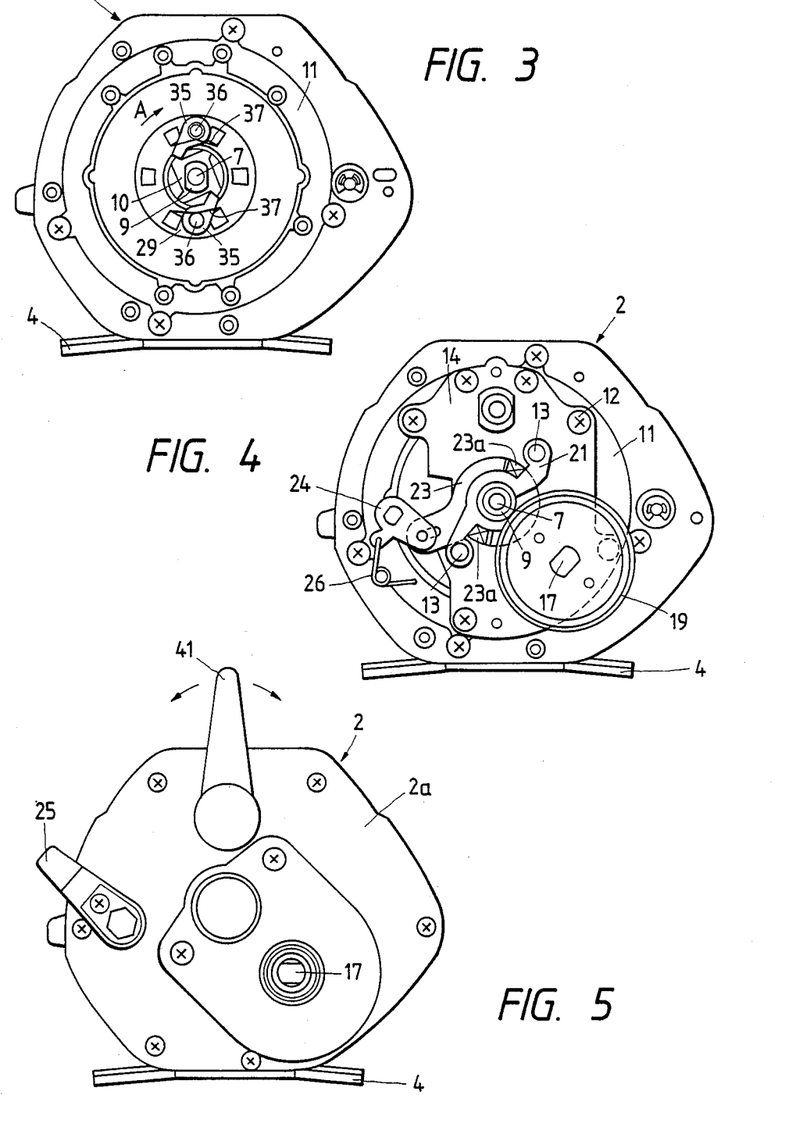
FIG. 3 is a cross-sectional view taken along the line III—III of FIG. 1 and particularly showing a one-way clutch mechanism.
FIG. 4 is a side view in which a right side cover member is removed from the fishing reel shown in FIG. 1, and particularly showing a clutch mechanism.
FIG. 5 is a right side external view showing the fishing reel according to the first embodiment.
Figure 6:
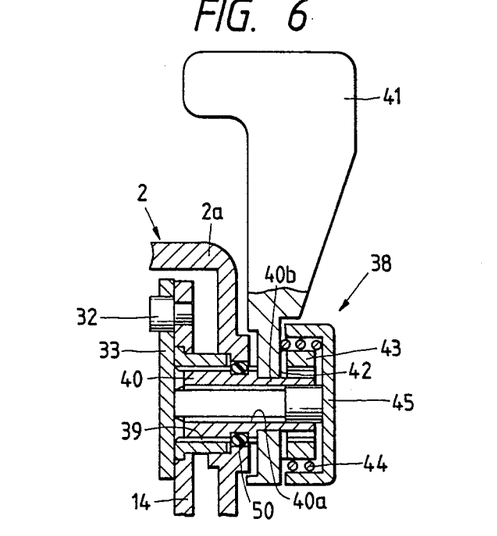
FIG. 6 is an enlarged cross-sectional view particularly showing a drag control mechanism in the fishing reel according to the first embodiment.

A drag support member 11 is fixedly secured to the frame 2, and a gear support plate 14 (FIG. 4) is fixedly secured to the drag support member 11 as shown in FIGS. 2, 4 and 6. The gear support plate 14 is secured to the drag support member 11 by screws 12 and a pair of guide rods 13 extending from the cover member 2a as shown in FIGS. 1 and 4. Further, a handle shaft 17 is rotatably supported to the cover member 2a by bearings 15 and 16. The handle shaft 17 has one end connected to an operation handle 18 and has another end coupled with a master gear 19 with which the pinion 9 is meshingly engaged. As a result, the rotation of the handle 18 is transmitted to the spool 8 through the handle shaft 17, the master gear 19 and the pinion 9 when the pinion 9 is at a position engaged with the spool shaft 7.

A clutch mechanism 20 is provided between the handle 18 and the spool 8 so as to perform selective power transmission from the handle 18 to the spool 8. The clutch mechanism 20 is generally provided in one of the side frames 2. That is, as shown in FIGS. 1 and 4, a clutch bar 21 is engaged with the pinion 9, and is slidable thereon. The sliding movement of the clutch bar 21 is guided by the pair of guide rods 13. Further, a coil spring 22 (FIG. 1) is provided over the guide rod 13, so that the clutch bar 21 is normally urged toward the spool 8, to thereby urge the pinion 9 toward the spool 8.

Furthermore, a clutch cam 23 is rotatably provided over the pinion 9. The clutch cam 23 has projections 23a, and is interposed between the clutch bar 21 and the gear support plate 14. The clutch cam 23 is pivotally connected to a clutch lever 24. The clutch lever 24 is connected to a dead point spring 26 which provides first and second pivot positions of the clutch lever 24. Further, the clutch lever 24 is also connected to a manual clutch knob 25 pivotally secured to the cover member 2a. When the operator manipulates the manual clutch knob 25 to a first position, the clutch lever 24 provides the first fixed position by the biasing force of the dead point spring 26, so that the clutch cam 23 is rotated in a first direction. In this case, the clutch bar 21 is in surface contact with the clutch cam 23 other than the projecting portions 23a, so that the clutch bar 21 is movable toward the pinion 9 by the biasing force of the coil spring 22. Accordingly, the pinion 9 is coupled to the spool shaft 7. On the other hand, when the operator manipulates the manual clutch knob 25 to a second direction, the clutch lever 24 provides the second fixed position by the biasing force of the dead point spring 26, so that the clutch cam 23 is rotated in a second direction (opposite to the first direction). In this case, the clutch bar 21 rides over the projections 23a of the clutch cam 23, so that the clutch bar 21 is moved toward the cover member 2a against the biasing force of the spring 22, whereby the pinion 9 is disengaged from the spool shaft 7.

A drag mechanism 27 is provided between the spool 8 and the pinion 9, and coaxial with the spool shaft 7 and the pinion 9. More specifically, the drag mechanism 27 is provided between the drag support member 11 and the cover member 2a. According to the drag mechanism 27 in this first embodiment, a plurality of drag washers 28, 29, 30 and 31 are provided in the drag support 11 and are juxtaposedly arranged relative to the axial direction of the spool shaft 7. The leftmost drag washer 28 is positioned close to the spool and in contact with the bottom wall of the drag support 11, whereas the rightmost drag washer 31 is in contact with a drag spring (belleville spring) 33 supported to the gear support plate 14 by pins 32. Frictional force between the neighboring drag washers is changeable so as to provide controlled slippage therebetween.

A one-way clutch mechanism 34 is provided between the pinion 9 and the drag mechanism 27 as best shown in FIGS. 1 and 3. The one-way clutch mechanism 34 is adapted to transmit rotational force from the rachet 10 to one of the drag washers 29 during fishing line casting operation. To be more specific, the drag washer 29 has an inner peripheral portion pivotally supporting reversal rotation restraint pawls 35 through pins 36. Each of the restraint pawls 35 is biased to a direction for engagement with the ratchet 10 by means of a pawl spring 37. During fishing line rewinding operation, the pawls 35 merely perform clicking with respect to the ratchet 10. Therefore, the rotation of the handle 18 is not transmitted to the drag mechanism 27, but is directly transmitted to the pinion 9. On the other hand, during the fishing line casting operation in which the rachet 10 is rotated in a direction indicated by an arrow A in FIG. 3, the pawls 35 are engaged with the rotating ratchet 10, so that the drag washer 29 connected with the pawls 35 is also rotated about the pinion 9 against the frictional force given by the neighboring drag washers 28 and 30. In other words, during fishing line casting operation, the drag force is automatically applied to the spool and it is unnecessary to perform switching operation for a drag control knob 41 described later.

According to the present invention, a drag control mechanism 38 is further provided in the side frame 2 and at a position offset from the spool shaft 7. As shown in FIGS. 1 and 6, the gear support plate 14 is formed with a thread hole 39 with which a drag control screw 40 is threadingly engaged. The drag control screw 40 extends through the cover 2a through a seal ring 50 and its one end portion 40b projecting from the cover 2a is fixedly connected to a drag control knob 41 through an unfastening preventive washer 42 by a nut 43. The drag control screw 40 is formed with a thread bore 40a at its central axial portion, and a preset screw 45 is threadingly engaged with the thread bore 40b through a preset spring 44. One end fo the preset spring 44 is in abutment with an inner surface of a head portion of the preset screw 45. By pivotal movement of the drag control knob 41, the drag control screw 40 and the preset screw 45 are rotated about their axes, so that urging force of the drag control mechanism with respect to the drag washers is changeable. That is, position of the inner end face of the preset screw 45 with respect to the drag spring 33 is changeable by the axial movement of the screw 45 upon manual angular rotation of the drag control knob 41. Accordingly, frictional force between the neighboring drag washers 28 thru 31 is changeable. Further, the preset screw 45 defines an initial drag force.

In view of the foregoing, according to the first embodiment of the invention, since the pinion 9 is connected to the drag washer 29 through the one-way clutch mechanism 34, it is unnecessary to operate a drag control lever 41 at every fishing line casting operation. That is, conventionally, when the drag force is required during fishing line rewinding operation, the operator turns the drag switch ON for avoiding fishing line breaking. However, during normal fishing line rewinding operation, drag force should be neutralized so as to minimize rotational manipulation force of the operation handle. When the fishing line is intended to be casted or released, the operator turns the drag switch ON to provide suitable drag force for weakening a catch. In contrast, according to the present invention, it is unnecessary to operate the drag switch when the fishing line casting operation is intended to be made because of the one-way clutch mechanism 34.

Further, according to the first embodiment, the drag mechanism 27 is provided coaxial with the spool shaft 7 and is separated therefrom. Therefore, resultant drag washers can have a large diameter, to thereby minimize unit pressure applied to the drag washers, to thus provide smooth sliding movements thereof.

Furthermore, according to the embodiment, the drag force is not directly applied to one side surface of the spool 8, but is applied to the drag support 11. Therefore, the bearings 5 and 6 which rotationally support the spool shaft 7 are not subjected to axial thrusting force. As a result, fishing line rewinding operation can be made with a reduced manual force, and the bearings can provide prolonged service life.

Furthermore, in the first embodiment, since the drag control mechanism 38 is provided offset from the pinion 9, the entire length of the fishing reel in axial direction of the spool can be reduced. Accordingly, it is unnecessary to largely extend the handle shaft 17 for avoiding mechanical interference between the handle and the drag control mechanism, so that excellent handle manipulation is attainable to thus obtain excellent operability.

A second embodiment according to this invention will next be described with reference to FIGS. 8 thru 13, wherein like parts and components are designated by the same reference numerals and characters as those shown in the first embodiment. In the second embodiment, similar to the first embodiment, there are provided a clutch mechanism 20A, a drag mechanism 27A, a drag control mechanism 38A and a one way clutch mechanism 34A.

In the second embodiment, one of the side frame 1 has a cover member 1a in which a bearing 5 is provided at its central portion. The bearing 5 rotationally supports one end portion of a spool shaft 7 similar to the first embodiment. On the other hand, the other side frame 102 includes a side plate 102a and a side cover 102b which covers the side plate 102a. The side plate 102a has its central portion provided with a bearing 107 through which the spool shaft 7 rotationally extends. Another distal end portion of the spool shaft 7 is rotationally supported by a cup-shaped bearing 106 supported by the cover member 102b. The bearing member 106 is provided movable in an axial direction of the spool shaft 7.

At the other end portion of the spool shaft 7, a pinion 9 and a ratchet 10 are provided. The ratchet 10 is fixedly secured to one end portion of the pinion 9, and these are rotatable together with the pinion shaft 7 and slidable therealong. A handle shaft 17 is rotatably supported by the side frame 102. The handle shaft 17 has one end coupled to an operation handle 18 and has another end coupled to a master gear 19 which is meshingly engaged with the pinion 9. Similar to the first embodiment, a clutch mechanism 20A is provided between the handle 18 and the spool shaft 7 for selectively transmitting rotational force of the handle 18 to the spool shaft 7. When the pinion 9 is axially moved toward a spool 8, the pinion 9 is brought into fitting engagement with an oblong shaped portion 7a of the spool shaft 7, and when the pinion is moved in the opposite direction, the pinion 9 is disengaged from the spool shaft 7.

Figure 8:
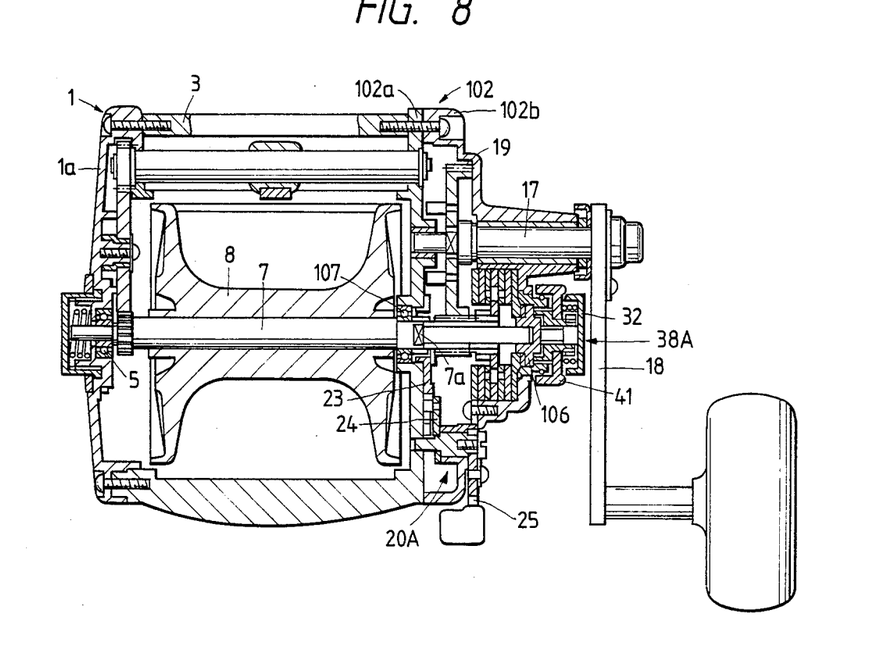
FIG. 8 is a cross-sectional front view showing a double bearing type fishing reel according to a second embodiment of this invention.
Figure 9:
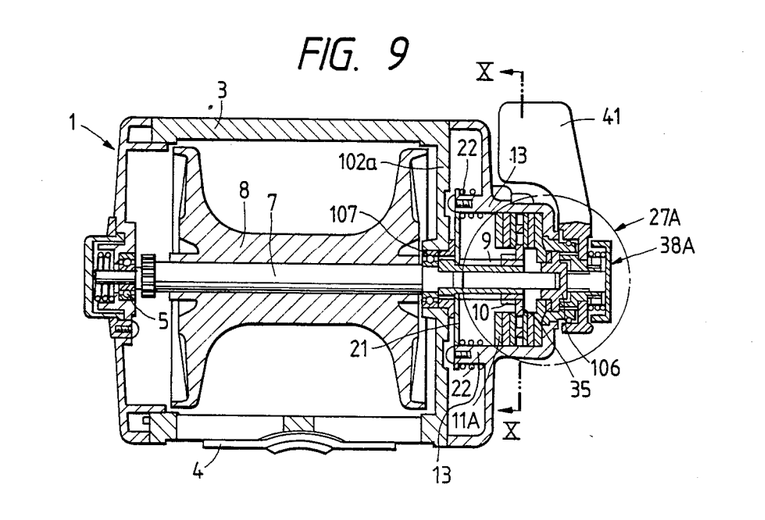
FIG. 9 is a cross-sectional front view showing the fishing reel but taken at the different sectional cutting showing the fishing reel according to the second embodiment.
Figure 10:
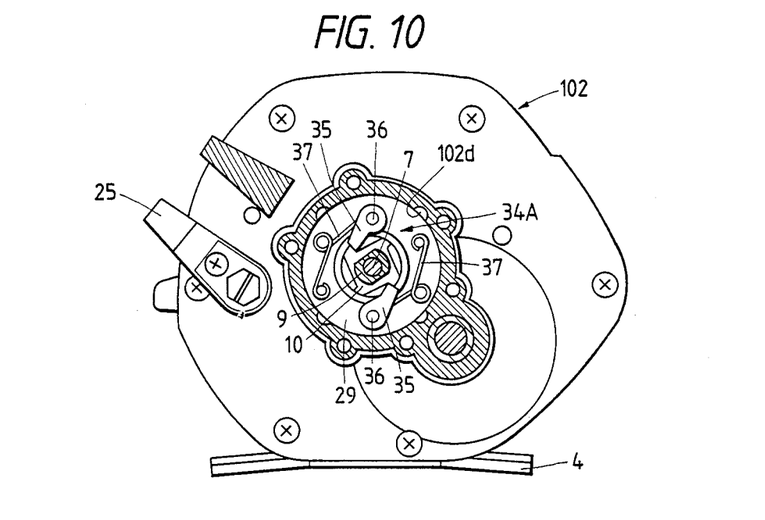
FIG. 10 is a cross-sectional view taken along the line X—X of FIG. 9 and particularly showing a one-way clutch mechanism.
Figure 11:
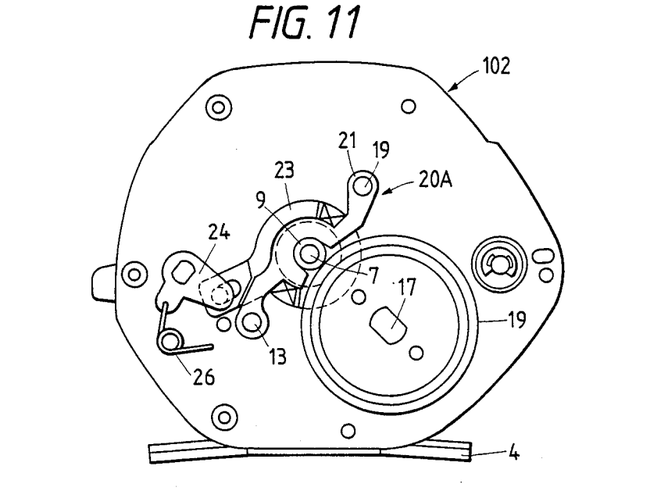
FIG. 11 is a side view particularly showing a clutch mechanism according to the second embodiment of the invention.
Figure 12:
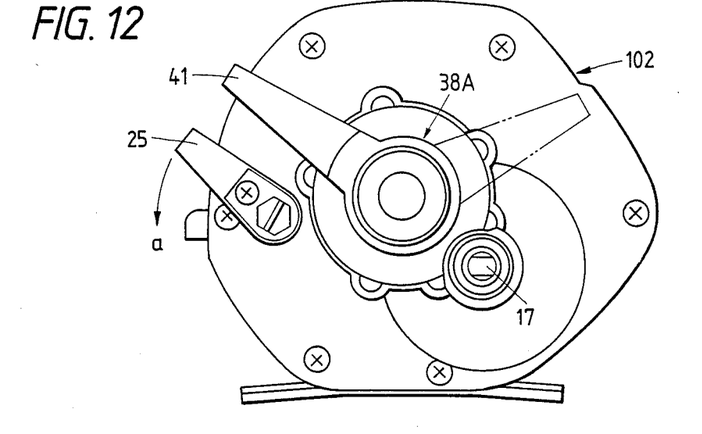
FIG. 12 is a right side view of the fishing reel according to the second embodiment.

More specifically, as shown in FIGS. 8, 11 and 12, the clutch mechanism 20A includes a clutch bar 21, a clutch cam 23, a clutch lever 24 and a clutch knob 25 similar to the first embodiment. The clutch bar 21 is engageable with the pinion 9 so as to move the latter in its axial direction. The movement of the clutch bar 21 is guided by a pair of guide rods 13 extending inwardly from the cover member 102b. The clutch bar 21 is normally biased toward the side plate 102a by a coil spring 22 disposed over each of guide rods 13. A clutch cam 23 is rotatably provided between the side plate 102a and the clutch bar 21. The clutch cam 23 is connected to the clutch knob 25 is pivotally supported to the side cover 102b through a clutch lever 24 biased by a dead point spring 26. In FIG. 12, when the clutch knob 25 is manually moved to a direction indicated by an arrow a, the clutch lever 24 provides its first position by the dead point spring 26, so that the clutch cam 23 is rotated to thereby provide a first position of the pinion 9 through the clutch bar 21. In this first position of the pinion 9, the pinion 9 is engaged with the spool shaft 7. When the clutch knob 25 is manually moved in a direction opposite to the arrow a, the clutch lever 24 provides its second position by the dead point spring 26, so that the clutch cam 23 is reversely rotated to thereby provide a second position of the pinion 9. This second position is provided by riding the clutch bar 21 on projections 23a of the clutch cam 23 against the biasing force of the coil spring 22, so that the pinion 9 is disengaged from the spool shaft 7.

The drag mechanism 27A in the second embodiment is constructed as follows. The side cover 102b is formed with a cup-shaped portion 102c (FIG. 13) concentrical with the spool shaft 7. An open end of the cup-shaped portion 102c is fixed with a drag support 11A, and a plurality of drag washers 28A, 29A and 31A are provided in an inner cylindrical space of the cup-shaped portion 102c. The drag washer 28A has one side surface confronting the drag support 11A and is engageable with grooves 102d formed at an inner peripheral surface of the cup-shaped portion 102c, so that the drag washer 28A is axially movable but is provided unrotatable. The drag washer 29A has one side surface confronting another side of the drag washer 28A. The drag washer 29A is provided rotatable about the pinion 9 and slidable thereon. The drag washer 31A has one surface confronting the other surface of the washer 29A and is engageable with the grooves 102d so that the washer 31A is unrotatable. Another surface of the washer 31A confronts the bearing 106 through a drag spring (belleville spring) 33. When the bearing 106 is moved toward the spool 8, the drag washer 31A is also urged toward the spool, so that the frictional force between the neighboring drag washers is increased.

Figure 13:
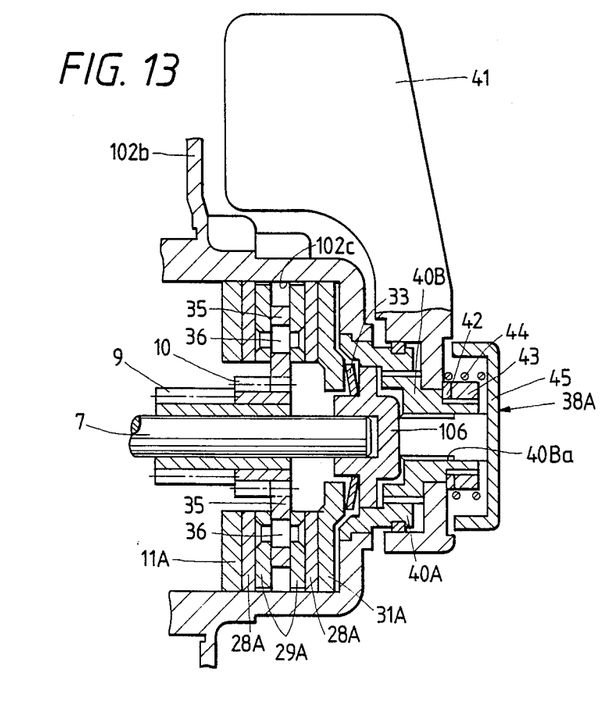
FIG. 13 is an enlarged cross-sectional view particularly showing a drag mechanism and a drag control mechanism according to the second embodiment of this invention.

The drag control mechanism 38A will next be described with reference to FIG. 13. According to the first embodiment of the invention, the drag control mechanism 38 is positioned offset from the spool shaft 7, whereas in the second embodiment, the mechanism 38A is positioned coaxially relative to the shaft 7. The above described bearing 106 has a cup shape cross-section so as to fit a distal end portion of the spool shaft 7. The bearing 106 is provided slidable in an axial direction of the spool shaft 7. The outer peripheral portion of the bearing 106 is slidable with respect to an inner peripheral surface of a first drag control screw 40A, and a second drag control screw 40B is threadingly engaged with the first drag control screw 40A. The second drag control screw 40B projects out of the first drag control screw 40A and its projected portion is connected to a drag control lever 41 by means of a nut 43 through a washer 42. Therefore, angular movement of the drag control lever 41 will rotate the second drag control screw 40B, so that the latter is axially moved by the threading engagement with the first drag control screw 40A. As a result, the bearing 106 is pushed by the distal end of the second drag control screw 40B for controlling frictional force given by the neighboring drag washers. Further, a central thread bore 40Ba is formed in the second drag control screw 40B, and a preset screw 45 is threadingly engaged with the central bore 40Ba. A preset spring 44 is provided between the drag control lever 41 and the preset screw 45 so as to normally urge the second drag control screw 40B toward the bearing 106. The preset screw 45 will control an inial position of the bearing 106 for controlling initial drag force given by the controlled frictional force between the neighboring drag washers.

The one-way clutch mechanism 34A according to the second embodiment will next be described with reference to FIGS. 9, 10, 12 and 13. The rotatable drug washer 29A includes a pair of washer pieces for interposing reversal rotation preventive pawls 35 between inner peripheral end portions of the pieces. Each of the pawls 35 is pivotally secured to the drag washer 29 through pins 36. Alternatively, a single drag washer 29A having relatively large thickness is provided (not shown), and grooves are formed at an inner peripheral surface of the thick washer 29A so as to pivotally accommodate the pawls 35 in the grooves. These pawls 35 are biased toward the ratchet 10 by springs 37 so that the pawls 35 are engageable therewith. When the pinion 9 or the ratchet 10 is rotated to a direction for rewinding the fishing line, the pawls 35 merely click on the ratchet 10. As a result, the drag washer 29A is not rotated. As a result, manual operational force of the handle 18 is directly transmitted to the pinion 9. On the other hand, when the ratchet 10 is rotated in a reverse direction for casting the fishing line, the pawls 35 engage the ratchet 10, so that the drag washer 29A is rotated against frictional force given by the neighbouring drag washers 28A and 31A. As a result, rotation preventive force is applied to the pinion 9.

According to the second embodiment, similar to the first embodiment, since the one-way clutch mechanism 34A is provided between the pinion 9 and the drag mechanism 27A, the drag mechanism is disconnected with the pinion 9 during fishing line rewinding operation, and the drag mechanism is automatically connected with the pinion during fishing line casting operation. Therefore, it is unnecessary to manually move drag control lever 41 regardless of line casting or rewinding.

Further, similar to the first embodiment, since the drag washers can be provided coaxial with the pinion 9 and the pawls 35 can be provided to the drag washer 29A, the washers having relatively large diameter can be provided, which in turn minimizes unit contact pressure. As a result, smooth sliding movement of the drag washers is attainable.

Furthermore, in the second embodiment, the axial movement of the drag washers does not deteriorate the teeth of the pinion 9, since the drag washers do not engage the teeth of the pinion 9, but only one of the drag washers 29A engages the ratchet 10. Therefore, the pinion 9 is not subjected to any mechanical damage. Further, more, the bearings 5 and 107 do not undergo thrusting load even by the drag force. Therefore, fishing line rewinding operation can be made with reduced manual force, and durability of the bearings is enhanced.

While the invention has been described in detail and with reference to specific embodiments thereof, it will be apparent for those skilled in the art that various changes and modifications can be made therein without departing from the spirit and scope of the invention.

What is claimed is:

1. A double bearing type fishing reel comprising:
   a pair of side frames having cover members provided thereover;
   a spool shaft rotatably supported by said side frames through bearings provided in each of said side frames;
   a spool concentrically fixed to said spool shaft;
   a handle shaft rotatably supported to one of said side frames, said handle shaft having end portions;
   a handle fixed to one end portion of said handle shaft;
   a master gear fixed to the other end portion of said handle shaft;
   a pinion meshingly engaged with said master gear and provided coaxially with said spool shaft, said pinion being movable in an axial direction of said spool shaft;

a drag support member secured to one of said side frames;

a clutch mechanism disposed in said one of said side frames and provided between said handle and said spool for selectively engaging said pinion with said spool shaft;

a drag mechanism provided between said drag support member and one of said cover members of said one of said side frames which secures said drag support member and coaxial with said spool shaft and said pinion;

a drag control mechanism connected to said drag mechanism for controlling drag force of said drag mechanism; and, a one-way clutch mechanism provided between said drag mechanism and said pinion for selectively connecting said pinion and said drag mechanism upon rotation of said handle shaft in a first direction but disconnecting said pinion and said drag mechanism upon rotation of said handle shaft in a second direction, said selective connection and disconnection of said one-way clutch mechanism being through the engagement between at least one pawl and a ratchet, said ratchet and said pinion comprising a single monolithic element movable together both rotationally and axially.

2. The double bearing type fishing reel as defined in claim 1, wherein said drag mechanism comprises a plurality of drag washers, wherein said one way clutch mechanism comprises:

one of said drag washers having an inner peripheral end portion;

said at least one pawl consisting of plural locking pawls pivotally supported to said inner peripheral end portion; and said ratchet fixed to one end of said pinion and rotatable with said pinion, said pawls being biased by biasing means toward said ratchet for engaging the same when said handle shaft is rotated in said first direction.

3. The double bearing type fishing reel as defined in claim 2, wherein said drag control mechanism is provided at a position offset from said drag mechanism.

4. The double bearing type fishing reel as defined in claim 3, wherein said drag support member is fixedly secured to said one of said side frames for accommodating therein said plurality of drag washers, one of the sidemost drag washers being in contact with said drag support member and another sidemost drag washer being urged by said drag control mechanism.

5. The double bearing type fishing reel as defined in claim 2, wherein said drag control mechanism is provided coaxially with said drag mechanism; and wherein said one of said side frame comprises a side plate, said side cover member covering said side plate, and said drag mechanism being accommodated in said side cover member.

6. The double bearing type fishing reel as defined in claim 5, wherein one of said bearings comprises a first bearing supported by said side plate for rotationally supporting said spool shaft, and a cup-shaped second bearing movably supported by said side cover through said drag control mechanism for rotationally supporting a distal end of said spool shaft, said drag control mechanism being provided at said side cover for biasing one side of said second bearing, and said second bearing having another side connected to said drag mechanism.

7. The double bearing type fishing reel of claim 2, wherein said drag washers are provided coaxially with said pinion.

8. The double bearing type fishing reel of claim 1, wherein the clutch mechanism and the one-way clutch mechanism are provided at the same side frame.

9. The double bearing type fishing reel of claim 1, wherein rotation of the handle is directly transmitted to said pinion during a fishing line rewinding operation.

* * * * *